Dec. 12, 1939.     R. H. GODDARD     2,183,311
MEANS FOR STEERING AIRCRAFT
Filed Oct. 18, 1937     2 Sheets-Sheet 1
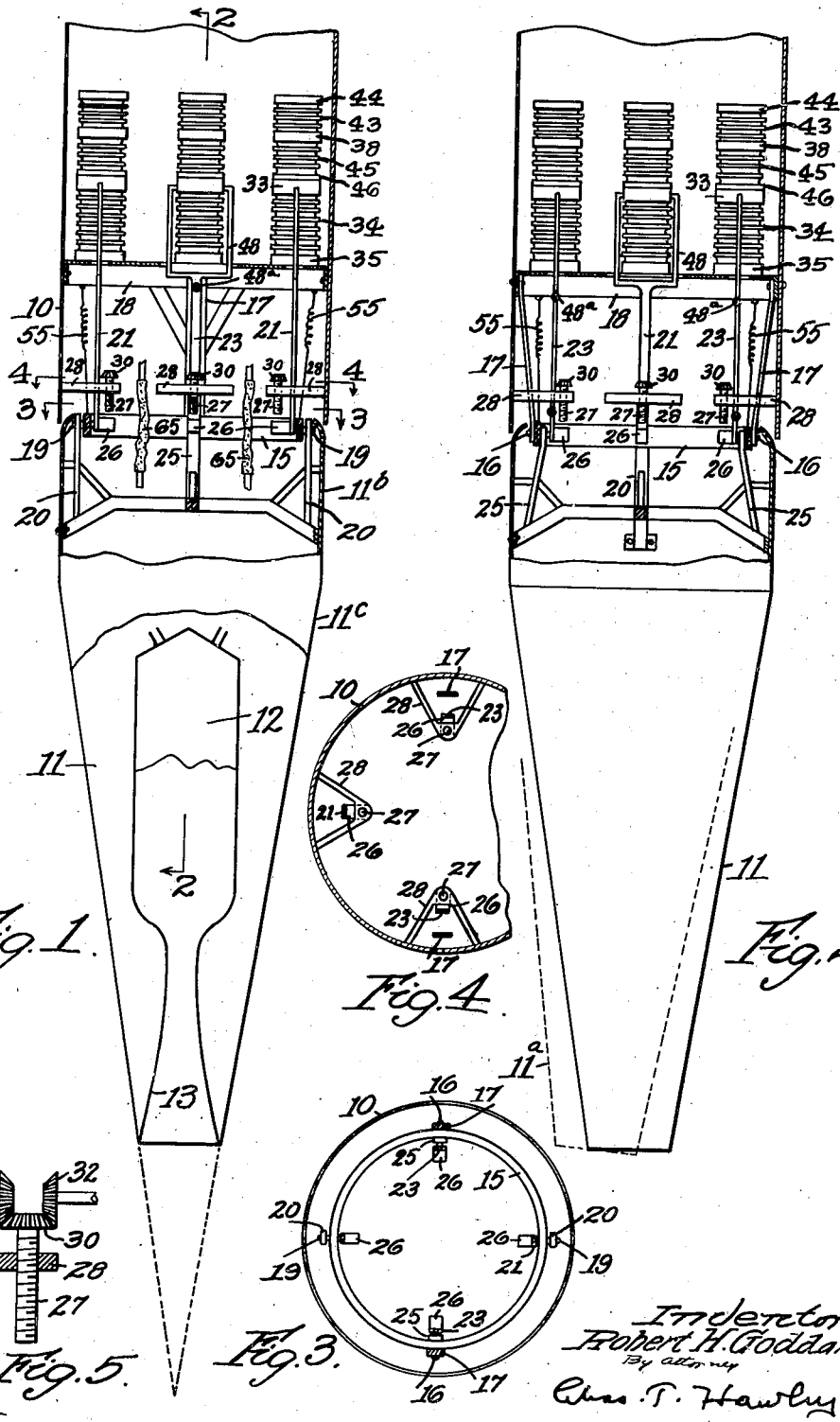

Dec. 12, 1939. R. H. GODDARD 2,183,311
MEANS FOR STEERING AIRCRAFT
Filed Oct. 18, 1937 2 Sheets-Sheet 2

Inventor
Robert H. Goddard
By attorney
Chas. T. Hawley

Patented Dec. 12, 1939

2,183,311

UNITED STATES PATENT OFFICE 2,183,311

MEANS FOR STEERING AIRCRAFT

Robert H. Goddard, Roswell, N. Mex.

Application October 18, 1937, Serial No. 169,583

9 Claims. (Cl. 244—85)

This invention relates to the control and direction of flight of an aircraft, and is particularly related to high speed aircraft of the rocket type which are propelled by discharge of gases from a combustion chamber.

It has been heretofore proposed to control the flight of such aircraft by fixed external vanes, or by vanes which are selectively moved into the slip stream of air surrounding the aircraft or into the rocket blast. Such vanes, if external, have serious air resistance which produces drag and reduces their steering effectiveness. If internal and movable into the rocket blast, the efficiency of the blast is decreased.

Moreover, if the speed of the craft varies widely, air vanes of fixed size are found unsatisfactory. If the vanes are large enough to provide satisfactory steering at low velocities, they are too large for use at high velocities, and if they are of the right size for high velocities, they are too small to be effective at low velocities.

It is the general object of my invention to provide improved means for steering aircraft, which steering means will be effective and satisfactory at low, moderate or high speeds, will be independent of the rocket blast in aircraft of the rocket type and equally effective whether the rocket blast is in operation or otherwise, and which will permit full streamlining of the aircraft.

More specifically, my invention in its preferred form relates to means for effecting changes in the longitudinal alignment of different longitudinally disposed elements of an aircraft, by which changes in alignment the direction of flight may be controlled.

My invention further relates to arrangements and combinations of parts which will be hereinafter described and more particularly pointed out in the appended claims.

A preferred form of the invention is shown in the drawings, in which

Fig. 1 is a partial side elevation, partly in section, showing my invention embodied in an aircraft which may be of the rocket type;

Fig. 2 is a sectional side elevation, taken along the line 2—2 in Fig. 1;

Figure 6:
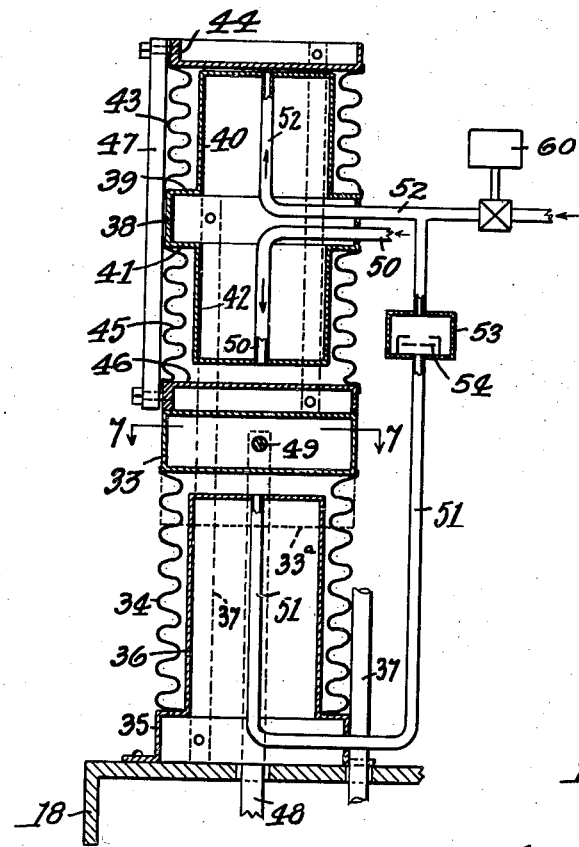
Figure 8:
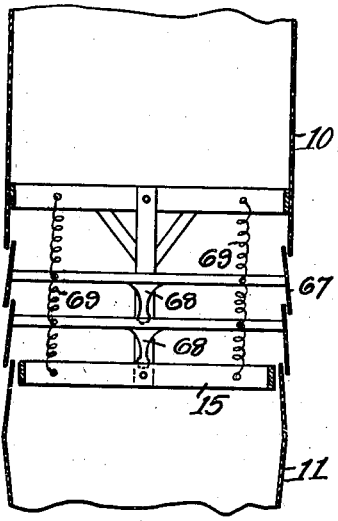
Figure 7:
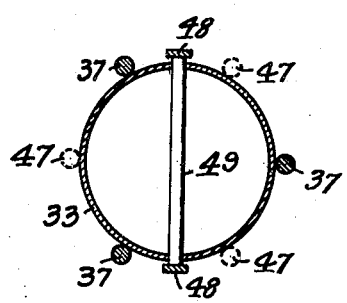
Figure 9:
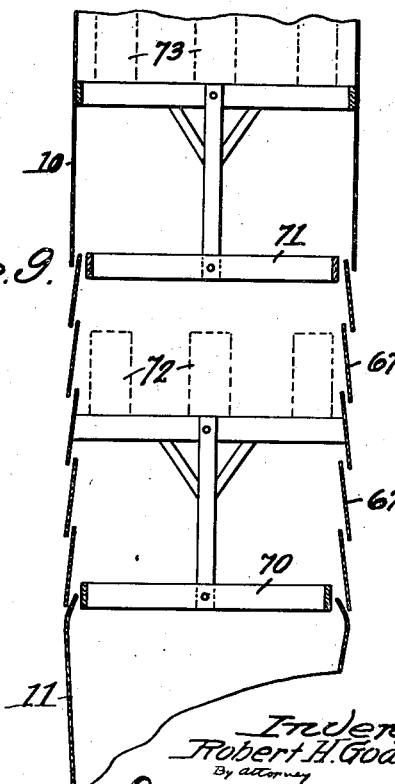

Figs. 3 and 4 are sectional plan views, taken along the lines 3—3 and 4—4 in Fig. 1;

Fig. 5 is a detail elevation of certain stop-adjusting mechanism to be described;

Fig. 6 is an enlarged sectional side elevation of one of the steering devices;

Fig. 7 is a sectional plan view, taken along the line 7—7 in Fig. 6;

Fig. 8 is a partial sectional side elevation showing a modified construction; and Fig. 9 is a similar view showing a further modification.

Referring to Figs. 1 to 7, I have shown my invention embodied in an aircraft which may be of the rocket type and which has a body comprising a forward casing 10 of cylindrical shape and a rear casing 11 connected to the forward casing 10 by mechanism to be described.

The rear casing 11 preferably comprises a front portion 11b which is substantially cylindrical and a tail portion 11c which tapers rearward.

The rear casing is adapted to be swung transversely relative to the forward casing in either of two planes which are perpendicular to each other. Such displacement is indicated in dotted lines at 11a in Fig. 2.

In aircraft of the rocket type, a combustion chamber 12 and nozzle 13 will be mounted within the rear casing 11 and vanes may be provided for rearward projection to form a point and close the rocket nozzle when the rocket blast is inoperative, as shown and described in my prior Patent No. 1,929,778.

If the craft is not of the rocket type, the tapered part 11c may be extended to a point, as indicated in broken lines in Fig. 1. The front end of the rear casing 11 is preferably contracted and curved inward, as shown in Fig. 1, and projects slightly within the rear end of the part 10.

The manner of mounting the rear casing 11 on the forward casing 10 for movement relative thereto will now be described. I provide a gimbal ring 15 (Figs. 1, 2 and 3) which is pivoted on two bearing studs 16 (Figs. 2 and 3) which are fixed in the lower ends of arms 17, located at opposite sides of the ring and extending forward within the casing 10 to a ring 18 to which they are firmly secured. The ring 18 is mounted in fixed position in the forward casing 10.

The gimbal ring 15 is thus mounted to swing about the axis of the bearing studs 16. Additional bearing studs 19 extend through the ring 15 at diametrical points equally spaced from the bearing studs 16, and the studs 19 are mounted in arms 20 which extend rearward in the casing 11 and are firmly secured to the internal frame work thereof.

The rear casing 11 can thus swing in one plane relative to the gimbal ring 15 and can swing in another plane with the ring 15 and relative to the front casing 10. The angular position of the rear casing 11 relative to the front casing 10 is controlled by two pull rods 21 pivotally attached to the ring 15 and by two additional pull rods 23 having a swivel connection to arms 25 fixed to the frame-work of the rear casing 11. Whenever one or more of the rods 21 or 23 are pulled upwardly, the rear casing 11 will be correspondingly deflected from normal axial alignment with the front casing 10.

It is desirable to limit the amount of angular deflection of the rear casing, and for this purpose I provide lugs or projections 26 on the lower ends of the pull rods 21 and 23, which projections engage stops 27 as they are moved forward to swing the casing 11. The stops 27 thus limit the deflection of the rear casing.

It is desirable that the amount of possible deflection be varied in accordance with operating conditions, particularly in rocket craft. When the rocket blast is in operation, it produces a very strong propelling force, so that a relatively small angular deflection of the rear casing 11 is needed for steering purposes. Furthermore, at the very high speed produced by the rocket blast, the external slip-stream of air produces an additional corrective force so that the required deflection of the rear casing will be even smaller. When the operation of the rocket blast ceases but high speed of the craft continues, the deflection for steering purposes should be somewhat increased but must still be relatively small. Thereafter, as the speed is substantially reduced and with no propulsive force, a substantially increased deflection is required to produce a corresponding steering action.

For convenient adjustment of the stop screws 27, I may provide the construction indicated in Figs. 1, 2 and 5. The screws 27 are mounted in fixed frame elements 28 in the forward casing 10 and are provided with bevel gears 30 connected by additional bevel gears 31 and shafts 32 so that all of the adjusting screws may be moved equally either toward or away from the projections 26. Convenient means will be provided for thus simultaneously adjusting the stop screws 27, which means may be manually operated or may comprise a suitable speed-controlled or pressure-controlled device.

It is essential that the rear casing 11 be held accurately in alignment with the front casing 10 for normal or straight flight, it being assumed that the center of gravity of the aircraft is substantially in the longitudinal axis thereof.

I will now describe the control devices by which the casing parts 10 and 11 are normally maintained in axial alignment and by which the rear part 11 may be deflected in a desired direction when correction of flight is necessary.

A separate control device is provided for each of the pull rods 21 and 23 and the details of construction of one of these devices is clearly shown in Figs. 6 and 7. A light hollow piston-like member 33 is mounted at the upper end of a metal bellows 34, the lower end of which is supported by a fixed flanged ring 35 having an upwardly extending tube 36 integral therewith and closed at its upper end. With this construction, the air space between the bellows 34 and the tube 36 is small and a minimum amount of air or gas is required to produce substantial expansion of the bellows 34, which is thus very rapid in operation.

The member 33 is guided for sliding movement by three rods 37 which are equally spaced angularly and which are fastened at their lower ends to the fixed ring 35 and at their upper ends to a fixed sleeve 38 having a ring 39 and closed tube 40 fixed on its upper face and a similar ring 41 and closed tube 42 on its lower face.

The ring 39 supports a metal bellows 43 closed at its upper end by a flanged disc 44. The ring 41 similarly supports a metal bellows 45 closed at its lower end by a flanged disc 46. The discs 44 and 46 are secured to each other in definite spaced relation by three tie-rods 47, (Fig. 7) equally spaced and positioned between the rods 37 previously described.

The use of metal bellows instead of cylinders and pistons is important, as it avoids the use of any lubricant which would become very stiff in the intense cold of high altitudes.

The disc 46 abuts the upper surface of the member 33 but is not secured thereto. The end of the tube 36 forms a stop to limit downward movement of the member 33.

An inlet pipe 50 communicates with the interior of the bellows 45 and a similar pipe 51 connects with the interior of the bellows 34. A branch pipe 52 similarly connects with the bellows 43. Air or gas pressure is maintained continuously in all of the pipes 50 and in all of the bellows 45, so that the connected discs 46 and 44 are normally pressed downward until the upper discs 44 engage the upper ends of the tubes 40 which acts as stops. The parts are thus maintained normaly in the position shown in Figs. 1 and 6, with the casing parts 10 and 11 definitely and axially aligned.

When it is desired to deflect the rear casing 11 in a given direction, the corresponding operating device is energized by admitting air or gas under pressure through the pipes 51 and 52. The air or gas admitted through the pipe 52 to the bellows 43 counteracts the continuous pressure in the bellows 45, so that the bellows 43 and 45 neutralize each other and leave the associated discs 44 and 46 free to move upward.

The air or gas admitted through the pipe 51 causes the member 33 to move upward. The member 33 is connected to a yoke 48 (Figs. 6 and 7) by a cross-pin 49, and the yoke 48 is connected to the upper end of one of the pull rods 21 or 23. In the case of the rods 21, the yoke may be integral with the rod, but in the case of the rods 23 the yoke is pivotally connected thereto as indicated at 48ª (Fig. 2) to permit swivelling adjustment. Upward movement of the member 33 continues until the projection 26 on the associated pull rod 21 or 23 engages its stop screw 27.

By the operation described, the rear casing 11 is swung out of alignment with the front casing 10, which deflection causes the aircraft to follow a curved path until the desired direction of flight is attained or restored.

It is desirable that the deflection of the rear casing 11 take place somewhat slowly to prevent over-correction and "hunting", and for this reason a control valve 53 is preferably provided in the pipe 51. The valve 53 may comprise a disc 54 which is normally seated so that air or gas can flow toward the bellows 35 only through a restricted opening in the disc. When the air or gas is being exhausted from the bellows, however, the discs will be raised thereby, permitting free flow of air out of the bellows.

While one of the control devices is thus operating to raise its connected pull rod and to correspondingly deflect the rear casing 11, it is important that the opposite control device shall not oppose this motion. The absence of any fixed connection between the member 33 and the disc 46 of the opposite control device permits its bellows 34 to be compressed and its member 33 to be moved freely downward by its pull rod 21 or 23 to the position 33ª in Fig. 6 as the rear casing 11 is swung away from said opposite control device. This condition obtains regardless of the fact that the corresponding upper disc 44 is under pressure and is in engagement with the upper end of its fixed tube 40.

It will be noted that the metal bellows 34 is longer than the bellows 43 or 45, and that the member 33 is correspondingly capable of substantially twice as great travel as the members 44 or 46. The forward travel of each member 33 is ordinarily limited by its associated stop screw 27 but its extreme forward travel is limited by engagement of the associated disc 46 with the lower end of the adjacent tube 42.

When an aircraft is traveling through a fairly dense atmosphere, there will be substantial side pressure on the rear casing 11, which side pressure will assist the bellows 45 of the operative control device to proportionately resist deflection of the rear casing and to restore the parts to initial alignment. When, however, a rocket craft is sent to a very high elevation where substantially no atmosphere exists, this external restoring force will not be present.

In order that the displacement of the rear casing 11 shall be proportional under all conditions to the pressure in the operative bellows 34, I provide springs as 55 (Figs. 1 and 2) connected to the gimbal ring 15. These springs exert slight force on the ring when the casings are aligned but one or more of said springs exert an increasing force as the rear casing is deflected.

The control of the air or gas pressure in the pipes 51 or 52 for steering purposes may be manual in certain types of aircraft, or may be gyroscopic in any type as set forth in my prior Patent No. 1,879,187. Such gyroscopic control apparatus is indicated diagrammatically at 60 in Fig. 6.

In a rocket craft where the fuel storage is in the forward casing 10 and the combustion chamber in the rear casing 11, flexible fuel pipe connections are required between the two casings, as indicated at 65 in Fig. 1.

In the case of aircraft operating at very high speed, it is desirable to minimize any abrupt change in alignment between the forward and rear casings, in order to prevent undue air resistance. This result may be attained by use of the construction shown in Fig. 8, in which a plurality of telescoping segments 67 are interposed between the forward casing 10 and the rear casing 11. Each of these telescoping segments may support an axial rod 68 having a ball-shaped end engaging a socket in the top of the next adjacent segment. Springs 69 are interposed between adjacent segments or casing parts to hold all parts normally in axial alignment and to equally distribute any angular deflection.

If the number of segments 67 is excessive, they may be divided into groups as indicated in Fig. 9, each group having a separate gimbal ring, as 70 and 71, and separate control devices, as 72 and 73.

The use and method of operation of my improved steering means having been set forth in detail in connection with the description of the mechanism, no further statement of operation appears necessary. Particular attention is called to the fact that I have provided effective means for steering an aircraft without the use of vanes and without projecting any element into the air stream or into the rocket blast. If desired, however, my improved steering means may be used in association with and in addition to steering or stabilizing vanes of either fixed or movable type.

My improved steering means as here disclosed has been tested in actual flights of rocket craft, and very satisfactory results have been attained, the stabilization being far superior to that obtainable by use of vanes.

Having thus described my invention and the advantages thereof, I do not wish to be limited to the details herein disclosed, otherwise than as set forth in the claims, but what I claim is:

1. In an aircraft, a forward casing, a rear casing, means to normally align said casings, means to deflect one of said casings from such alignment, means to limit such displacement in a plurality of directions, and means to simultaneously adjust all limiting positions.

2. In an aircraft, a forward casing, a rear casing, means to normally align said casings, means to deflect one of said casings from such alignment, stops to limit such deflection in both directions in each of two perpendicular planes, and means to simultaneously adjust said stops to vary all of said deflection limits.

3. In an aircraft, a forward casing, a rear casing, and a plurality of devices jointly effective to control the relative alignment of said casings, each control device comprising means normally operative to maintain initial alignment, means to change such alignment, and means to neutralize said first means when said second means becomes operative.

4. In an aircraft, in combination, a body portion, a gimbal ring swiveled in said body portion, a rear casing secured to and movable with said ring, a plurality of stops to limit swinging movement of said ring in different directions, and means to simultaneously adjust all of said stops.

5. In an aircraft, a continuous sectional casing comprising front and rear casing members each forming a substantial longitudinal portion of said casing, means to normally align said casing members, means operated by fluid pressure and effective to correct the flight of said aircraft by changing the relative alignment of said forward and rear casing members, additional fluid pressure-operated means effective to thereafter restore said casing members to their initial alignment, and a device permitting free flow of fluid from said first-named pressure-operated means but permitting restricted flow only to said pressure-operated means.

6. In an aircraft, a continuous sectional casing comprising front and rear casing members each forming a substantial longitudinal portion of said casing, means to normally align said casing members, means to deflect one of said casing members from such alignment, and a plurality of telescoping annular segments interposed between the adjacent ends of said members and maintaining surface continuity as said members are relatively deflected.

7. In an aircraft, a continuous sectional casing comprising relatively deflectable front and rear casing members each forming a substantial longitudinal portion of said casing, and a plurality of steering devices each operative independently under external control to deflect one of said members from axially aligned position, each of said steering devices comprising a first bellows element operative to deflect said casing member in one direction, a second bellows element normally operative to maintain said forward and rearward casing members in alignment, and a third bellows element effective to neutralize said second bellows element when said first bellows element is rendered operative.

8. In an aircraft, a continuous sectional casing comprising relatively deflectable front and rear casing members each forming a substantial longitudinal portion of said casing, and a plurality of steering devices each operative independently under external control to deflect one of said members from axially aligned position, and normally operative, when free from external control, to restore said members to initial axial alignment, and each of said steering devices comprising a bellows-operated element connected to said deflectable casing member and a second element operated by additional bellows to restore said casing members to initial alignment, said first element being effective to move said second element in one direction but being movable in the opposite direction independently of said second element and to a greater extent.

9. In an aircraft of the rocket-propelled type, a casing comprising a forward portion and a rear portion which are relatively deflectable, a combustion chamber and nozzle mounted in said rear portion and providing the entire propelling power for said aircraft, and flight-controlled means to move said rear portion out of alignment with said forward portion and to thereby render the gases discharged through said nozzle effective to correct the direction of flight of said craft.

ROBERT H. GODDARD.